United States Patent Office 3,778,310
Patented Dec. 11, 1973

3,778,310
HIGH ENERGY DENSITY BATTERY HAVING UNSATURATED HETEROCYCLIC SOLVENT CONTAINING ELECTROLYTE
Bruce Hollis Garth, Newark, Del., assignor to E. I. du Pont de Nemours and Company, Wilmington, Del.
No Drawing. Continuation-in-part of abandoned application Ser. No. 112,415, Feb. 3, 1971. This application May 1, 1972, Ser. No. 249,049
Int. Cl. H01m 11/00
U.S. Cl. 136—100 R           9 Claims

ABSTRACT OF THE DISCLOSURE

High energy density galvanic batteries having high utilization of active electrode material with low gas production can be prepared using voltaic cells having an anode of one of the light metals of Groups I–A or II–A of the Periodic Table, a compatible metal cathode and an electrolyte containing a solvent component consisting essentially of a mixture of from 5 to about 80% by weight of a five membered unsaturated heterocyclic hydrocarbon compound and complementally from 95 to about 20% by weight of a saturated ether and a dissolved salt having the formulas $MM'F_6$, MSCN or $MClO_4$ where M is Li, Na, or K and M' is P, As or Sb.

CROSS-REFERENCE TO RELATED APPLICATIONS

This application is a continuation-in-part of copending application Ser. No. 112,415 filed Feb. 3, 1971, now abandoned.

BACKGROUND OF THE INVENTION

(1) Field of the invention

This invention relates to high energy density batteries having active metal anodes, metallic compound cathodes and non-aqueous electrolytes.

(2) Prior art

The art discloses a number of high energy density galvanic batteries having voltaic cells consisting of light metal anodes, metallic compound cathodes and liquid non-aqueous electrolytes.

For example, French Pat. No. 1,490,726 to Societe des Accumulaleurs Fixes et de Traction (hereinafter S.A.F.T.) discloses such batteries in which the electrolyte is a saturated cyclic ether (tetrahydrofuran) and $LiClO_4$. U.S. Patent No. 3,511,716 to Gabano et al., also assigned to S.A.F,T., teaches adding a second saturated ether to the tetrahydrofuran to increase solubility of the $LiClO_4$. In U.S. Pat. No. 3,468,716, Eisenberg teaches an electrolyte composed of a mixture of a pentacyclic ester, saturated ether and $LiClO_4$. None of the above teachings suggest the use of unsaturated heterocyclics to improve the performance of a saturated ether/salt electrolyte.

While the theoretical energy, i.e. the electrical energy potentially available from a selected anode-cathode couple, is easily calculated, there is a need to choose a non-aqueous electrolyte for such couple that permits the actual energy produced by the complete battery to approach the theoretical energy to a practical degree. The problem is that it is practically impossible to predict in advance how well a non-aqueous electrolyte will function, in this respect, with a selected couple. More broadly stated, such batteries must be considered as whole units, each unit having three parts which parts are not predictably interchangeable from unit to unit.

SUMMARY OF THE INVENTION

This invention provides a novel high energy density galvanic battery comprised of at least one voltaic cell comprising an anode of a Group I–A or II–A metal having an equivalent weight no more than 23, a cathode containing a major proportion of metal compound reducible by the anode and an electrolyte having a conductivity of at least $1 \times 10^{-4}$ ohm$^{-1}$ cm.$^{-1}$ at 25° C., containing a solvent component consisting essentially of a mixture of from 5 to about 80% by weight of at least one five-membered unsaturated heterocyclic hydrocarbon compound having no replaceable hydrogen and having at least one heterocyclic atom selected from the group of oxygen, sulfur and nitrogen and complementally from 95 to about 20% by weight of at least one saturated ether selected from the group of saturated ethers having the formula $RO(R'O)_nR''$ where R is a $C_1$ to $C_4$ alkyl group, R'' is a $C_1$ to $C_4$ alkyl group, R' is a 1,2-alkylene radical having 1 to 3 carbon atoms and $n$ is 0 to 4 and the formula $RO(R'O)_nR'$ in which the saturated ether is a three to six-membered ring where R+R'' form an alkylene radical having from 2 to 6 carbon atoms, R' is a 1,1- or 1,2-alkylene radical having 1 to 3 carbon atoms and $n=0$ or 1 and a dissolved salt selected from the class consisting of the compounds having the formulas $MM'F_6$, MSCN and $MClO_4$ where M is selected from the group consisting of Li, Na, and K and M' is selected from the group consisting of P, As and Sb.

Such galvanic batteries show high utilization of the anode and cathode active ingredients and, generally, very low gas production during discharge. A particular advantage of the present invention is that it provides an electrolyte which is highly effective in batteries with close-spaced electrodes.

DESCRIPTION OF THE INVENTION

The discussion of the battery and cell components will be more easily understood with reference to the anode, electrolyte and cathode components.

Anodes

The high energy density battery concept requires maximum battery energy output from a minimum weight and/or volume of battery components. Thus, the highly electropositive light metals of Groups I–A and II–A of the Periodic Table are the most promising anode materials. Such metals having an equivalent weight no greater than 23 are used to avoid heavier metals with less available energy per unit weight. By equivalent weight is meant the metal atomic weight divided by its usual maximum oxidation valence. Therefore, lithium, sodium, beryllium, magnesium and calcium are possible anode metals. Of these, lithium is preferred, because it has the lowest equivalent weight and is the most electropositive of all the metals. Lithium is also preferred because as a ductile, soft metal, it is easily disposed in a battery in intimate electrical contact with a current collecting means providing an anode contact external to the battery. Of course sodium shares this important advantage, but sodium is somewhat less preferred because it has about 3 times the equivalent weight and almost twice the specific gravity. Sodium, is however, less costly than lithium.

Electrolytes

The novel electrolytes of this invention are made up of a solvent component and, for conductivity, a salt dissolved in the solvent component. The solvent component consists essentially of at least two different non-aqueous solvents. One of these two different solvents is a 5-membered, ring-oxygen, sulfur and/or nitrogen unsaturated heterocyclic hydrocarbon compound having no hydrogen replaceable by the above active anode metals, for example, no labile hydrogen such as provided by a —OH, >NH or —SH group. By unsaturated is meant that in the 5-membered ring there is at least one carbon-carbon or carbon-nitrogen double bond. Examples of such 5-membered, ring-unsaturated heterocyclic compounds include furans, 1-alkylpyrroles, 1-alkylpyrazoles, 1-alkylimidazoles, thiazoles, isothiazoles, oxazoles, isoxazoles, furazans, oxadiazoles and their mixtures, wherein alkyl groups are usually lower alkyl groups, e.g. methyl or ethyl groups.

Representative are furan, 3-methylfuran, 3-ethylfuran, 2,5-dimethylfuran, 3,4-dimethylfuran, 1-methylpyrrole, 1-ethylpyrrole, 1,3-dimethylpyrrole, 1-methylpyrazole, 1-ethylpyrazole, 1,3-dimethylpyrazole, 1-methylimidazole, 1-ethylimidazole, 1,4-dimethylimidazole, thiazole, 2,4-dimethylthiazole, isothiazole, 3,5-dimethylisoxazole, furazan, 3,4-dimethylfurazan, 1,2,4-oxadiazole, 1,3,4-oxadiazole and the like and mixtures thereof.

Of the above unsaturated heterocyclic compounds 3,5-dimethylisoxazole, 1-methylpyrrole, 3,4-dimethylfurazan, 2-methyl-4,5-dihydrooxazole, 2,4-dimethylthiazole, furan and 2,5-dimethylfuran or mixtures thereof are preferred because of good miscibility with the ether cosolvents to be described, effectiveness in batteries when mixed with the ether cosolvents or ready availability. Especially preferred because they tend to provide a battery showing very low gassing are 3,5-dimethylisoxazole, 1-methylpyrrole, furan, and 2,5-dimethylfuran and 2-methyl-4,5-dihydrooxazole.

Normally for the solvent component of the electrolyte one utilizes from 5 to about 80% by weight of one or more of the above unsaturated heterocyclic compounds and, complementally from 95 to about 20% by weight of at least one saturated ether having the formula $RO(R'O)_nR''$ where R and R'' are $C_1$ to $C_4$ alkyl groups, $n$ is 0 to 4 and R' is a $C_1$ to $C_3$ 1,2-alkylene group, or alternatively, where the saturated ether is a 3 to 6-membered ring, viz where R and R'' taken together form a $C_2$ to $C_6$ alkylene radical, R' is a $C_1$ to $C_3$ 1,1- or 1,2-alkylene and $n$ is 0 to 1. Representatve of such saturated ethers are, for example, dimethyl ether, diethyl ether, methylpropyl ether, ethylbutyl ether, 1,2-dimethoxyethane, 1,2-dibutoxypropane, the dimethyl ethers of diethylene glycol, triethylene glycol and tetraethylene glycol, tetrahydrofuran, dioxolane, 1,3-propylene oxide, 1,2-propylene oxide, 2,3-butylene oxide, 3-ethyltetrahydrofuran, 1,4-dioxane, 3-methyldioxane-1,4, tetrahydropyran, 4-methyltetrahydropyran, 4,4-dimethyldioxane-1,3, 4-methyldioxane-1,3, 2-ethyldioxolane, mixtures thereof and the like. Among these, diethyl ether, tetrahydrofuran, and 1,2-dimethoxyethane or mixtures thereof are preferred because of effectiveness in batteries, good miscibility with the above preferred unsaturated heterocyclic compounds and/or ready availability or low cost.

It should be understood that appreciable amounts of organic diluents can be present in the solvent component of the electrolyte without departing from the concept of this invention. It is essential that there be present at least about 5% by weight of one of the 5-membered unsaturated heterocyclics and at least 20% by weight of one of the saturated ethers, and preferably a major amount of the electrolyte solvent is composed of members of these two classes. However, diluents which do not appreciably interfere with the function of the two required classes of compounds can be present in substantial amounts and can contribute even up to 40% or 50% by weight of the solvent. Representative of such diluents are methyl acetate, dimethyl carbonate, diethyl carbonate, methyl ethyl carbonate, propylene carbonate, propyl acetate, ethylene carbonate, toluene and the like.

Salts useful for providing conductivity to the above-described solvent component are those having the formulas $MM'F_6$, MSCN and $MClO_4$ where M is the cation of Li, Na or K, and M' is P, As or Sb. Representative of such salts are, for example, $LiPF_6$, $NaPF_6$, $KPF_6$, $NaAsF_6$, $KAsF_6$, $LiSbF_6$, LiSCN, NaSCN, $LiClO_4$, $KClO_4$. Of these salts $LiClO_4$, $NaPF_6$ and LiCNS are preferred because of effectiveness in providing high conductivity and inertness towards the anode metals and the solvents.

The concentration of said salts in said solvents can range up to saturation. Normally a sufficient quantity of such salt is dissolved in the solvent to provide an electrolyte having a conductivity of at least $1 \times 10^{-4}$ ohm$^{-1}$ cm.$^{-1}$. Preferred concentrations of the preferred salts usually lie between about 5 and about 30% by weight of the whole electrolyte. Within this range high conductivity is provided. It is most preferred that the electrolyte salt used is $LiClO_4$ in amounts of from about 10% to about 15% based on the weight of electrolyte; $NaPF_6$ in amounts of about 20% based on the weight of electrolyte; or LiSCN in amounts of about 10% based on the weight of electrolyte.

Cathodes

Broadly the cathodes of the present invention contain a major proportion of a compatible metal compound reducible by the anode metals, said metal compound being in practical electrical contact with a current collecting means ultimately providing an external electrical cathode contact for the battery. By compatible is meant such reducible metal compound which is practically resistant to attack on the non-aqueous electrolyte or, through dissolution in said electrolyte, to attack on the active anode metal.

Operable reducible metal compounds include inorganic metal compounds, for example, simple halides, oxides or sulfides of such metals as lead, palladium, mercury, cadminum, silver, copper, nickel, iron and manganese. Representative are, for example, $PbO_2$, HgO, $Hg_2O$, $CdF_2$, $Ag_2O$, AgCl, CuO, $Cu_2O$, CuS, $Cu_2S$, $Cu_9S_5$ (digenite), NiS, $Ni_7S_6$, FeO, $Fe_3O_4$, FeS, $FeS_2$, $Fe_2O_3$, $MnO_2$, mixtures thereof and the like. Other suitable cathodes include the phosphates, sulfates and chromates of metals such as iron, copper, nickel, silver, vanadium and tungsten and the oxides, fluorides and sulfides of vanadium and tungsten. Representative of these are $V_2O_5$, $Ag_3PO_4$, $CuSO_4$, $Ag_2CrO_4$ and $WO_3$. More complex inorganic metal compounds can also be utilized as cathode materials. Among these are, for example, $Cu_2Fe(CN)_6$ and $CuCO_3.Cu(OH)_2$. Organic acid salts are also useful. Representative, for example, are nickel oxalate, copper tartrate and copper citrate. Such non-metallic compounds as the carbon fluoride disclosed in U.S. Pat. 3,536,532 are also suitable cathodes.

Cathodes may be prepared from such reducible metal compounds by a wide variety of art known means such as, for example, pressing the compounds in finely divided form into a coherent body which can be operably placed in a battery in contact with the current collecting means, or casting those fusible members of the above group, etc. It will be appreciated that, since many such reducible metal compounds are not conductive they must be mixed with a suitably conductive material, such as up to 15% by weight of carbon, before being formed into cathodes.

Preferred metal compounds are conductive and require little or no added conductive material. Such preferred reducible metal compounds are those consisting essentially of CuS, FeS, $Ni_7S_6$ and NiS. CuS is particularly preferred because of its inertness and high performance. These metal sulfides are available commercially or easily prepared, for example, by precipitation by contacting an aqueous solution of the appropriate metal ion with a sulfide ion source and, as discussed more fully below, by sintering a mixture of the elements, viz the appropriate metal or a mixture of the metals in particulate form with particulate elemental sulfur. Since as already stated these sulfides are conductive they may be formed into cathodes without added conductive material. However, mixing such compounds with a small amount, e.g. 5% or less, of a particulate conductive material prior to final forming may improve the performance of the cathode in terms of high active ingredient utilization during battery discharge.

Cathodes of these preferred sulfides are readily formed by simple means. For example, iron sulfide cathodes consisting essentially of FeS, i.e. having greater than 70% FeS and some iron oxide are prepared by pressing a mixture of iron and sulfur powders (1:1 atom ratio) into a coherent structure and sintering the structure at 600–650° C. for 10 to 30 minutes. Highly preferred copper sulfide cathodes consisting essentially of CuS, i.e. containing more than 90% CuS, are very readily prepared from a mixture of copper and sulfur powders pressed into a desired shape and cured at above the melting point of sulfur, such as in Example 1. NiS and $Ni_7S_6$ suitable for pressing into cathodes are prepared by sintering in an inert atmosphere, a 1:1 atom ratio mixture of nickel and sulfur powders at about 600° C., grinding the resulting products and then pressing the pulverized material into a cathode of desired shape. X-ray diffraction analyses indicate that $Ni_7S_6$ is the major product with short periods of such sintering, e.g. up to 2.5 hours, while NiS is the major product of longer sintering, e.g. 16 hours. Thus choice of sintering method provides materials consisting essentially of $Ni_7S_6$ or NiS.

A further method for preparing rigid, coherent iron or nickel sulfide cathodes for use in the batteries of this invention comprises mixing a little free sulfur, e.g. about 10 to about 15%, with particulate iron sulfide or nickel sulfide, pressing the mixture to form a coherent body and then heating the body slowly to about 350° C. or higher and maintaining the body at that temperature to vaporize away any free sulfur. This process provides a cathode self-bonded by solid solutions of the original metal sulfide and the sulfur. Such solid solutions provide little or no free sulfur which may interfere with high battery performance.

In some instances it is desirable to incorporate into the cathode structure some binder material. Ordinarily such a binder is incorporated as a powder prior to fabrication of the cathode and representative of suitable resin binders is polytetrafluoroethylene powders in amounts ranging from about 1% to about 15% by weight.

Batteries

This invention does not concern battery design or construction; nor is electrode spacing meant to be limited. However, it is desirable to utilize batteries having closely spaced electrodes, say spacings of from about 0.2 to about 0.5 mm., to minimize electrolyte quantity and battery size.

The electrolytes of this invention would be readily utilized in a close-spaced electrode battery such as that suggested by the disclosure of Gabano et al. in U.S. 3,511,716.

EXAMPLES

Example 1

A mixture having a 1:1 atom ratio of sulfur-to-copper was prepared from sublimed sulfur powder and electrolytic copper dust having $50\mu$ maximum particle size. The mixture was aged at about 25° C. for a period of about 7 days. By means of a powder press, a coherent disk of the aged mixture was prepared in contact with a coextensive disk of nickel metal mesh. The coherent disk was next cured for about 4 minutes by heating between two nickel plates previously heated to 225° C. The resulting flat cathode structure contained 0.96 g. of copper sulfide and had a single face area of 6.5 cm.$^2$.

Next the cathode disk was tightly fitted, mesh-side-to-nickel, into a cylindrical machined recess in a nickel plate. In a dry argon atmosphere, the recess in a matching plate was packed with 0.19 g. of lithium metal. A gas-tight cell was prepared in the argon atmosphere by bolting the two plates together with insulated bolts against a 0.4 mm. thick, circular pad of inert, non-woven fiber held inside a polypropylene spacer ring of somewhat larger diameter than the cathode and anode recesses. A tight seal between the edges of the spacer and the nickel plates was assured by using synthetic chlorinated rubber gaskets. There resulted a cell with anode and cathode faces closely spaced, 0.4 mm. apart. The cell was evacuated and allowed to fill, until the pressure was at atmospheric pressure, with an electrolyte solution which was 12 weight percent of $LiClO_4$, 73 weight percent of tetrahydrofuran and 15 weight percent of 3,5-dimethylisoxazole. After sealing the openings in the plates used to evacuate and to fill the cell, the cell was discharged at room temperature (about 25° C.) through a constant load of 180 ohms to an arbitrary cut-off of 1.0 volt. The average discharge voltage was 1.52 volts. Cathode utilization, calculated as CuS was 80% and the battery delivered 722 watt-hours per kg. of lithium and copper sulfide as calculated from the total amount of lithium and copper sulfide originally present in the battery. This battery produced no measurable volume of gas.

Examples 2–7

Examples 2–7, which are summarised in Table I, demonstrate the utility of other representative unsaturated heterocyclic compounds of the invention. The batteries were assembled and discharged as in Example 1. The balance of the electrolyte, not shown, was tetrahydrofuran.

TABLE I

| Example No. | Unsaturated heterocyclic solvent (wt. percent) | $LiClO_4$, wt. percent | Discharge load, ohms | CuS utilization, percent | Watt-hr. per kg. Li-CuS | Gas vol. per internal cell vol. |
|---|---|---|---|---|---|---|
| 2 | N-methylpyrrole (5) | 10 | 180 | 72 | 542 | 0.5 |
| 3 | 3,4-dimethylfurazan (5) | 10 | 180 | 63 | 439 | 2.5 |
| 4 | 2-methyl-4,5-dihydrooxazole (5) | 10 | 180 | 76 | 522 | 0.6 |
| 5 | 2,4-dimethylthiazole (50) | 15 | 125 | 81 | 531 | 1.8 |
| 6 | Furan (45) | 10 | 174 | 85 | 650 | 0.9 |
| 7 | 2,5-dimethylfuran (27) | 10 | 174 | 82 | 566 | 0.3 |

Surprisingly, as little as 5% of one of the invention unsaturated heterocyclics in the electrolyte strikingly improves battery performance vis à vis that of a battery having none of such heterocyclic.

The following comparative example illustrates the superiority in cathode utilization and energy output of the example batteries over a Li/CuS battery containing a saturated ether based electrolyte as taught in French Pat. No. 1,490,726.

Example 8

A battery assembled and dischaged as in Example 1 but containing as the electrolyte 10 weight percent $LiClO_4$ dissolved in tetrahydrofuran showed only 25% CuS utilization and delivered only 194 watt-hours per kg. of Li and CuS.

Despite art suggesting the contrary, the unsaturated heterocyclic solvents surprisingly improve battery performance even at an electrode spacing of only 0.4 mm.

The following example demonstrates the use of a different saturated ether and a different salt of the invention.

Example 9

A battery assembled as in Example 1 and discharged through 174 ohms had an electrolyte of 20 weight percent $NaPF_6$, 56 weight percent 3,5-dimethylisoxazole and 24 weight percent 1,2-dimethoxyethane. The battery showed 84% CuS utilization, produced 692 watt-hours per kg. of Li and CuS. No gas was produced by the battery.

The following comparative example indicates that the unsaturated heterocyclic compounds of the invention used without a saturated ether are ineffective.

Example 10

A battery as in Example 9 but having an electrolyte of 20 weight percent of $NaPF_6$ and 80 weight percent of 3,5-dimethylisoxazole, showed only 4% CuS utilization and delivered only about 2 watt-hours per kg. of Li and CuS.

The following comparative example indicates further that the saturated ethers of the invention used without the unsaturated heterocyclic compound are poor electrolytes in the present batteries.

Example 11

A battery as in Example 9 with 20 weight percent of $NaPF_6$ dissolved in 80 weight percent of 1,2-dimethoxyethane showed only 3% CuS utilization and delivered only about 24 watt-hours per kg. of Li and CuS.

The following example illustrates the use of a mixture of saturated ether components and yet another salt of the invention.

Example 12

A battery as in Example 1 discharged through 180 ohms contained 9.0 weight percent of lithium thiocyanate, 27.6 weight percent of tetrahydrofuran, 45.4 weight percent of 3,5-dimethylisoxazole and 18 weight percent of the dimethyl ether of diethylene glycol. CuS utilization was 90%. The battery produced 658 watt hours per kg. of Li and CuS. No gas was produced.

The embodiments of the invention in which an exclusive property or privilege is claimed are defined as follows:

1. In a high energy density galvanic battery comprising at least one voltaic cell comprising an anode of a Group I-A or II-A metal having an equivalent weight no greater than 23, an electrolyte solution and a cathode containing a major proportion of metal compound reducible by said anode, the improvement comprising using as the electrolyte solution an electrolyte having a conductivity at 25° C. of at least $1 \times 10^{-4}$ ohm$^{-1}$ cm.$^{-1}$ containing a solvent component consisting essentially of a mixture of from 5 to about 80% by weight of at least one five-membered unsaturated heterocyclic hydrocarbon compound having no replaceable hydrogen and having at least one heterocyclic atom selected from the group of oxygen, sulfur and nitrogen and complementally from 95 to about 20% by weight of at least one saturated ether selected from the group of saturated ethers having the formula $RO(R'O)_nR''$ where R is a $C_1$ to $C_4$ alkyl group, R'' is a $C_1$ to $C_4$ alkyl group, R' is a 1,2-alkylene radical having 1 to 3 carbon atoms and $n$ is 0 to 4 and the formula $RO(R'O)_nR''$ in which the saturated ether is a three to six-membered ring where R+R'' form an alkylene radical having from 2 to 6 carbon atoms, R' is a 1,1- or 1,2-alkylene radical having 1 to 3 carbon atoms and $n=0$ or 1 and a dissolved salt selected from the class consisting of the compounds having the formulas MM'F, MCNS and MClO$_4$ where M is Li, Na or K and M' is P, As or Sb.

2. The improved battery of claim 1 wherein the unsaturated heterocyclic compound is selected from furans, 1-alkylpyrroles, 1-alkylpyrazoles, 1-alkylimidazoles, thiazoles, isothiazoles, oxazoles, isoxazoles, furazans, oxadiazoles and their mixtures.

3. The improved battery of claim 1 in which the anode is selected from the group consisting of lithium and sodium, the cathode consists essentially of metallic compound selected from the group consisting of CuS, FeS, NiS and $N_7iS_6$ and the electrolyte solvent consists essentially of at least one unsaturated heterocyclic selected from 3,5-dimethylisoxazole, 1-methylpyrrole, 3,4-dimethylfurazan, 2-methyl-4,5-dihydrooxazole, 2,4-dimethylthiazole, furan and 2,5-dimethylfuran, and at least one saturated ether selected from diethyl ether, 1,2-dimethoxyethane, the dimethyl ether of diethylene glycol and tetrahydrofuran and the dissolved salt is $LiClO_4$, $NaPF_6$ or LiSCN in amounts ranging from about 5% to about 30% based on the weight of electrolyte.

4. The improved battery of claim 3 in which the anode is lithium and the cathode consists essentially of CuS.

5. The improved battery of claim 3 in which the unsaturated heterocyclic solvent component is 3,5-dimethylisoxazole, 1-methylpyrrole, furan, 2,5-dimethylfuran or 2-methyl-4,5-dihydrooxazole and the saturated ether component is 1,2-dimethoxyethane or tetrahydrofuran.

6. The improved battery of claim 5 in which the anode is lithium and the cathode consist essentially of CuS.

7. The improved battery of claim 3 in which the electrolyte consists essentially of from about 10 to about 15% by weight of $LiClO_4$, from about 5 to about 50% by weight of an unsaturated heterocyclic compound selected from 3,5-dimethylisoxazole, 1-methylpyrrole, 2-methyl-4,5-dihydrooxazole, 2,4-dimethylthiazole, furan and 2,5-dimethylfuran and the balance of the weight percent of the electrolyte being tetrahydrofuran.

8. The improved battery of claim 6 in which the electrolyte consists essentially of about 20% by weight of $NaPF_6$, about 55% by weight of 3,5-dimethylisoxazole and about 25% by weight of 1,2-dimethoxyethane.

9. The improved battery of claim 6 in which the electrolyte consists essentially of about 10% by weight of LiSCN, about 45% by weight of 3,5-dimethylisoxazole, about 30% weight of tetrahydrofuran and about 15% by weight of the dimethyl ether of diethylene glycol.

References Cited

UNITED STATES PATENTS

| | | | |
|---|---|---|---|
| 3,726,716 | 4/1973 | Ahearn et al. | 136—100 R |
| 3,468,716 | 9/1969 | Eisenberg | 136—155 |
| 3,542,601 | 11/1970 | Gabano | 136—155 |
| 3,544,385 | 12/1970 | Newman | 136—155 |
| 3,546,022 | 12/1970 | Castle et al. | 136—155 |
| 3,701,688 | 10/1972 | Gabano et al. | 136—155 |

DONALD L. WALTON, Primary Examiner

U.S. Cl. X.R.

136—154, 155